United States Patent
Kulan et al.

[11] Patent Number: 5,746,436
[45] Date of Patent: May 5, 1998

[54] AIR PRESSURIZED CHUCK

[75] Inventors: Stephen Kulan, Muskogee; Kenneth L. Smith, Porum, both of Okla.

[73] Assignee: Coburn Optical Industries, Inc., Tulsa, Okla.

[21] Appl. No.: 501,410

[22] Filed: Jul. 12, 1995

[51] Int. Cl.$^6$ .......................... B23B 31/103; B23B 31/30
[52] U.S. Cl. .......................... 279/4.04; 279/4.12; 279/37; 279/108; 279/156; 451/384; 451/398
[58] Field of Search .......................... 279/4.04, 4.12, 279/35, 37, 106, 108, 156; 451/384, 385, 398

[56] References Cited

U.S. PATENT DOCUMENTS

| | | | |
|---|---|---|---|
| 1,180,355 | 4/1916 | White | 279/4.12 |
| 2,859,042 | 11/1958 | Drissner et al. | 279/108 |
| 3,599,996 | 8/1971 | Holt | 279/37 |
| 3,962,832 | 6/1976 | Strasbaugh | 451/384 |
| 4,277,916 | 7/1981 | Buhler | 451/384 |
| 5,520,078 | 5/1996 | Hattori et al. | 279/5 |

*Primary Examiner*—Steven C. Bishop
*Attorney, Agent, or Firm*—Frank J. Catalano; Scott R. Zingerman

[57] ABSTRACT

An air pressurized chuck has a spindle journalled in a housing for rotation about a longitudinal axis. One means is mounted in a penultimate portion of the spindle and rotatable therewith for longitudinally reciprocating along the axis in one direction in response to the bias of a coil spring disposed concentrically about the axis between the spindle and the reciprocating means and in an opposite direction in response to a pneumatic force selectively applied to the reciprocating means in excess of the bias. Another means is mounted in an ultimate portion of the spindle and rotatable therewith for concentrically reciprocating gripping portions thereof in relation to the longitudinal axis in an outward direction in response to movement of the longitudinal reciprocating means in the one direction and in an inward direction in response to movement of the longitudinal reciprocating means in the opposite direction. A third means fixed to the spindle and rotatable therewith establishes a reference plane transverse to the longitudinal axis. The spring has a diameter smaller than a smallest outer diameter of the spindle. The small diameter spring minimizes wobble in the rotating spindle. Maintaining the reference plane independent of the concentric reciprocating means assures consistent positioning of a workpiece to be gripped longitudinally in relation to the chuck.

16 Claims, 10 Drawing Sheets

AIR PRESSURIZED CHUCK

BACKGROUND OF THE INVENTION

This invention relates generally to ophthalmic lens-making machines and more particularly concerns the chucks used in mounting lens blanks in lens-making machines.

Presently known lens chucks are adequate for use with lensmaking machines capable of providing modest lens surface enhancement. However, recent improvements in lens making machines have so increased their enhancement capabilities that known chucks have become a limitation on the levels of enhancement that are now possible.

Two structural features of known chuck assemblies are primarily responsible for their deficiency. First, asymmetry of the rotating components of the chuck results in an inherent imbalance in relation to the longitudinal axis of the chuck, causing the chuck to wobble as it rotates about the axis. This wobble is transferred from the chuck to the lens and results in visible distortion of the lens surface. Such wobble can result from the use of coil springs having variations in wire diameter. The greater the diameter of the coils, the greater the distortion resulting from the variation in wire diameter. Second, in known chucking devices, the position of the lens along the longitudinal axis is a function of the positioning of the block supporting the lens in relation to some reference position on the chuck. Typically, this axial reference positioning is accomplished by the same component of the chuck which is used to grip the block. Since the longitudinal axis reference structure and the block gripping structure are one and the same, a precise longitudinal reference position is not achieved in every case, nor is geometric center of the block concentrically achieved in every case. Such variations in axial and concentric lens positioning will cause movement of the optical center, prism in the lens and variations in the lens center thickness.

It is, therefore, an object of this invention to provide an air pressurized chuck for a lens maker which minimizes lens distortion resulting from asymmetry in the chuck. It is a further object of this invention to provide an air pressurized chuck for a lensmaker which has minimal asymmetry about its longitudinal axis of rotation. It is also an object of this invention to provide an air pressurized chuck for a lens maker in which the reference structure for establishing the axial position of the lens is independent of the gripping structure for securing the lens block in the chuck.

SUMMARY OF THE INVENTION

In accordance with the invention, an air pressurized chuck is provided in which a spindle is journalled in a housing for rotation about a longitudinal axis. One means is mounted in a penultimate portion of the spindle and rotatable therewith for longitudinally reciprocating along the axis in one direction in response to the bias of a coil spring disposed concentrically about the axis between the spindle and the reciprocating means and in an opposite direction in response to a pneumatic force selectively applied to the reciprocating means in excess of the bias. Another means is mounted in an ultimate portion of the spindle and rotatable therewith for concentrically reciprocating gripping portions thereof in relation to the longitudinal axis in an outward direction in response to movement of the longitudinal reciprocating means in the one direction and in an inward direction in response to movement of the longitudinal reciprocating means in the opposite direction. A third means fixed to the spindle and rotatable therewith establishes a reference plane transverse to the longitudinal axis. The spring has a diameter smaller than a smallest outer diameter of the spindle. The small diameter spring minimizes wobble in the rotating spindle. Maintaining the reference plane independent of the concentric reciprocating means assures consistent positioning of a workpiece to be gripped longitudinally and concentrically in relation to the chuck.

In a preferred embodiment of the chuck, the spindle has penultimate and ultimate cylindrical housings in a forward portion thereof and a piston is longitudinally reciprocable in the penultimate cylindrical housing. The coil spring is seated in the spindle concentrically about the axis and biases the piston forwardly. A plurality of symmetrically displaced fluid ports communicate into the penultimate housing forward of the piston for selectively admitting fluid under pressure therein to overcome the spring bias and drive the piston rearwardly. A rod fixed to the piston reciprocates therewith and has a knob symmetrically extending forwardly therefrom into the ultimate cylindrical housing. A plurality of longitudinally extending fingers are symmetrically displaced for reciprocal motion of the knob therebetween and pivotally engaged with the ultimate cylindrical housing for concentric reciprocation of a forward portion of the fingers in relation to the longitudinal axis. The fingers having a camming surface contoured to an opposing surface of the knob so that the fingers move in an outward direction in response to forward movement of the knob and in an inward direction in response to rearward movement of the knob. A plate fixed to a forward end of the ultimate housing has a forward surface thereon which establishes the reference plane transverse to the longitudinal axis and forward of the forwardmost or gripping portion of the fingers. Preferably, the plate has a central aperture therethrough for permitting a block to be chucked to have a rearward portion thereof rearwardly inserted between the forwardmost or gripping portions of the fingers until a forward portion thereof abuts the reference surface of the plate. Preferably the plate also has a plurality of radial slots for concentric reciprocation of fingers therein.

In the preferred embodiment, the pivotal engagement of the fingers is an instantaneous pivot defined by a knurl extending outwardly from each of the fingers into an annular groove along a forward portion of the ultimate housing. The camming surface and the opposing surface are contoured to provide a distance from a tangent point of those surfaces to the instantaneous pivot approximately equal to twice the distance from the instantaneous pivot to the forward or gripping portion of the fingers.

In a preferred embodiment, a ring fixed to the penultimate housing has a central aperture for slidable reciprocation of a neck of the rod therein and a seal annularly disposed therebetween prevents flow of fluid from the penultimate housing into the ultimate housing. Preferably, the ring has a plurality of symmetrically displaced apertures which slidably receive pins extending forwardly from the piston so as to prevent rotation of the piston and guide the reciprocal motion of the piston relative to the axis.

For convenience, the knob has a bore and a seat extending rearwardly into its front portion which is contoured to receive adapters for holding one or more known blocks therein.

The chuck could be hydraulic rather than pneumatic.

BRIEF DESCRIPTION OF THE DRAWINGS:

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1A:
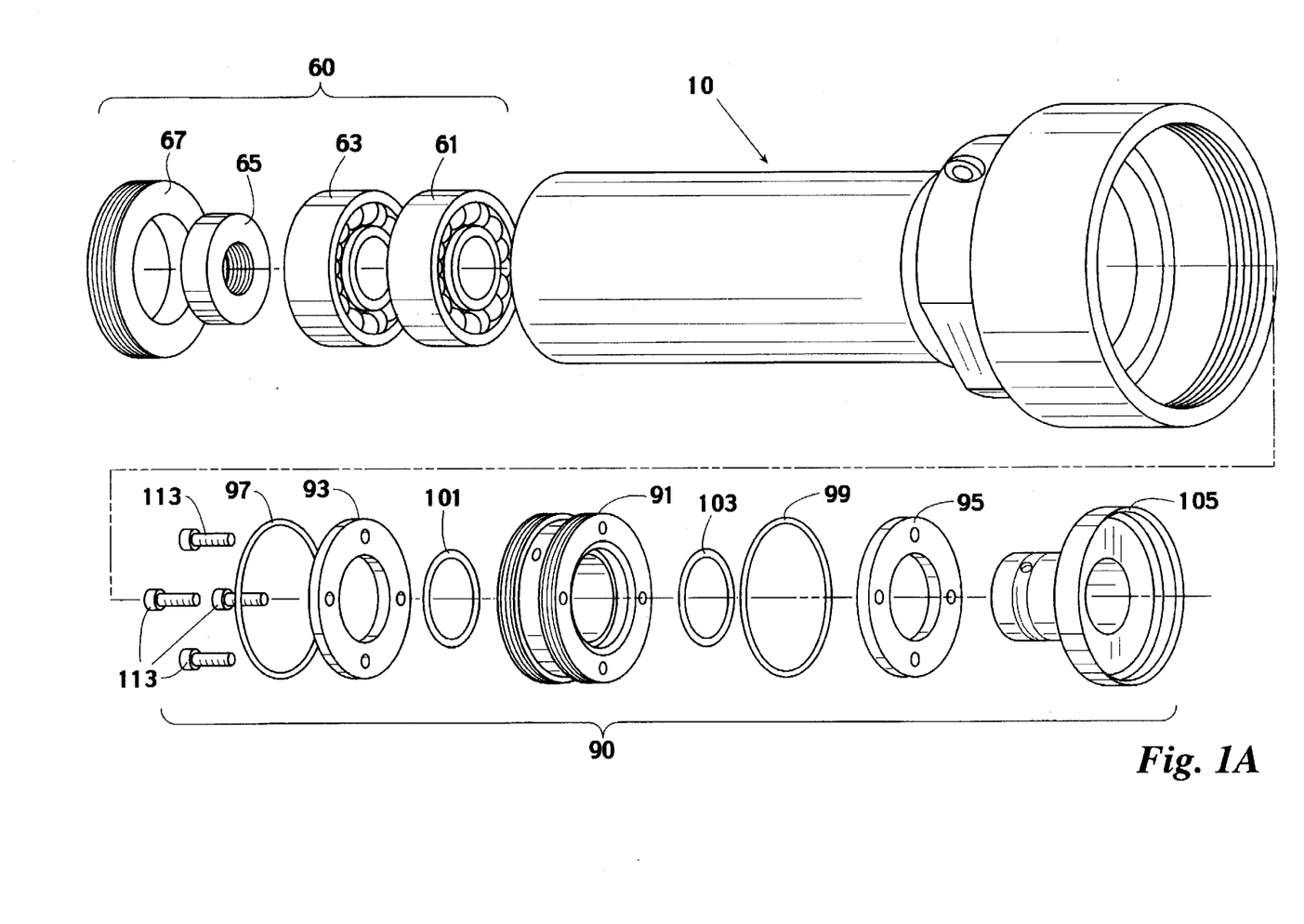
FIG. 1 is a perspective assembly view of a preferred embodiment of the air pressurized chuck.
Figure 1B:
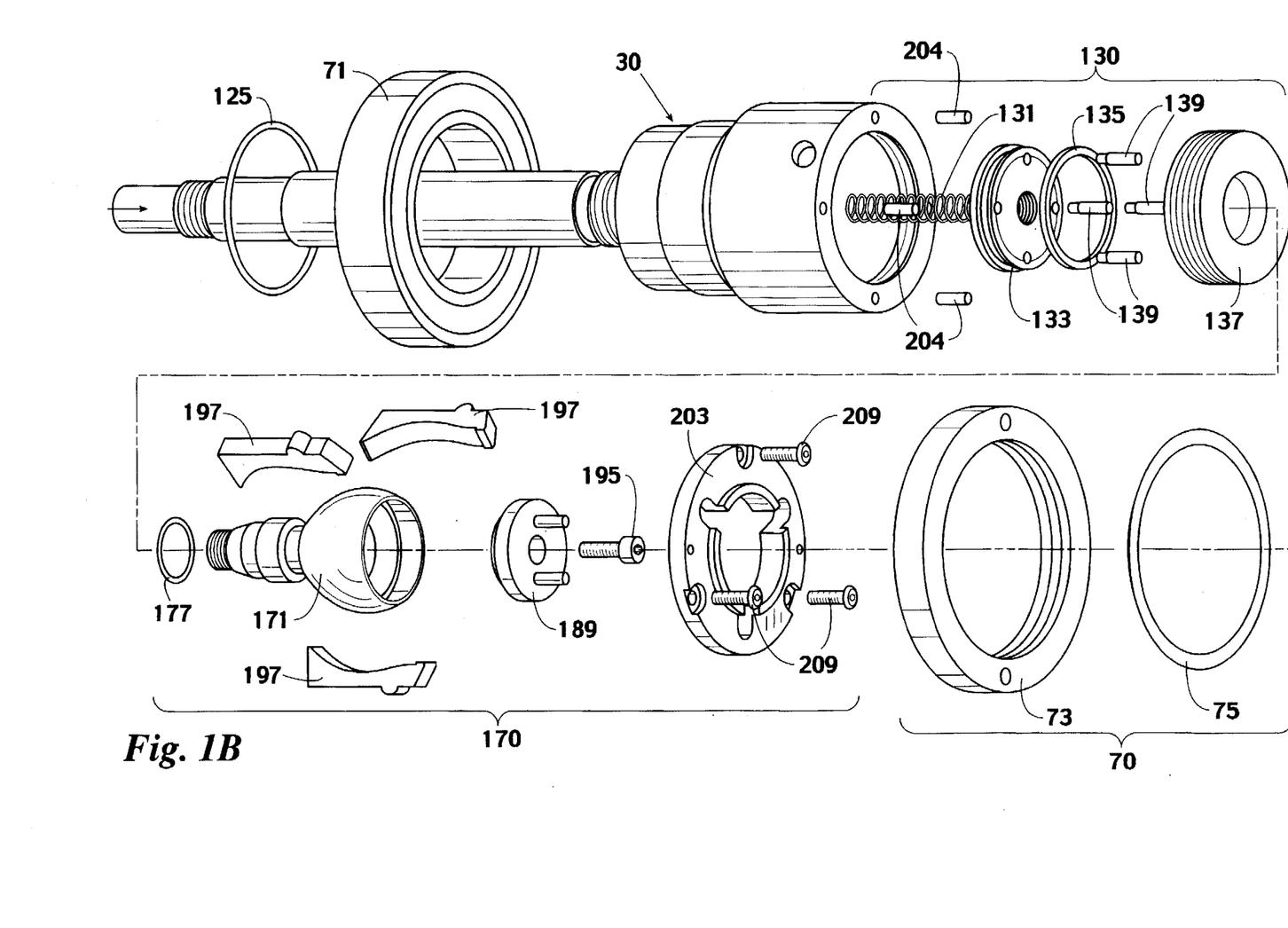
Figure 2:
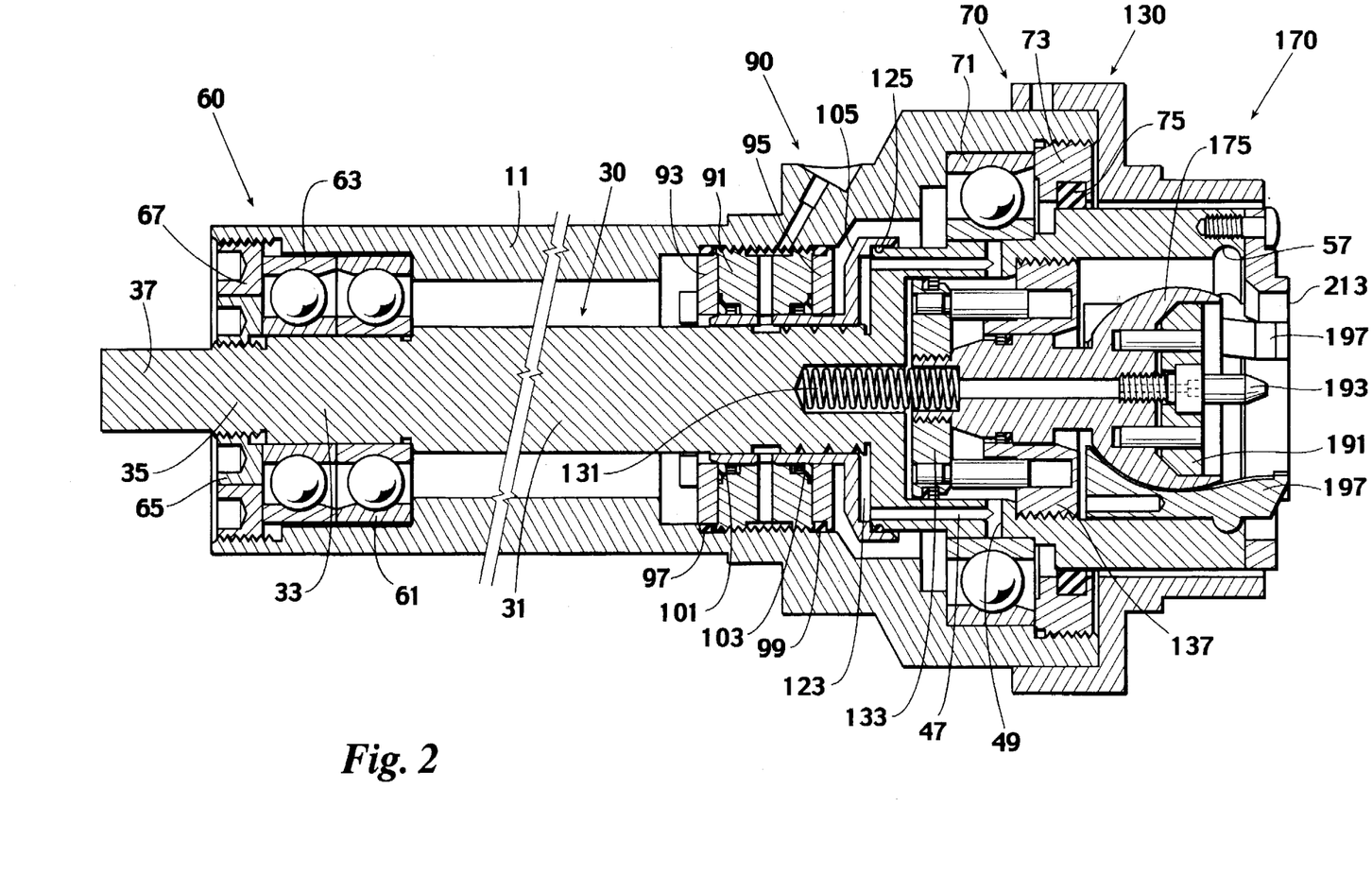
FIG. 2 is a longitudinal cross-section of the air pressurized chuck of FIG. 1 in closed condition.
Figure 3:
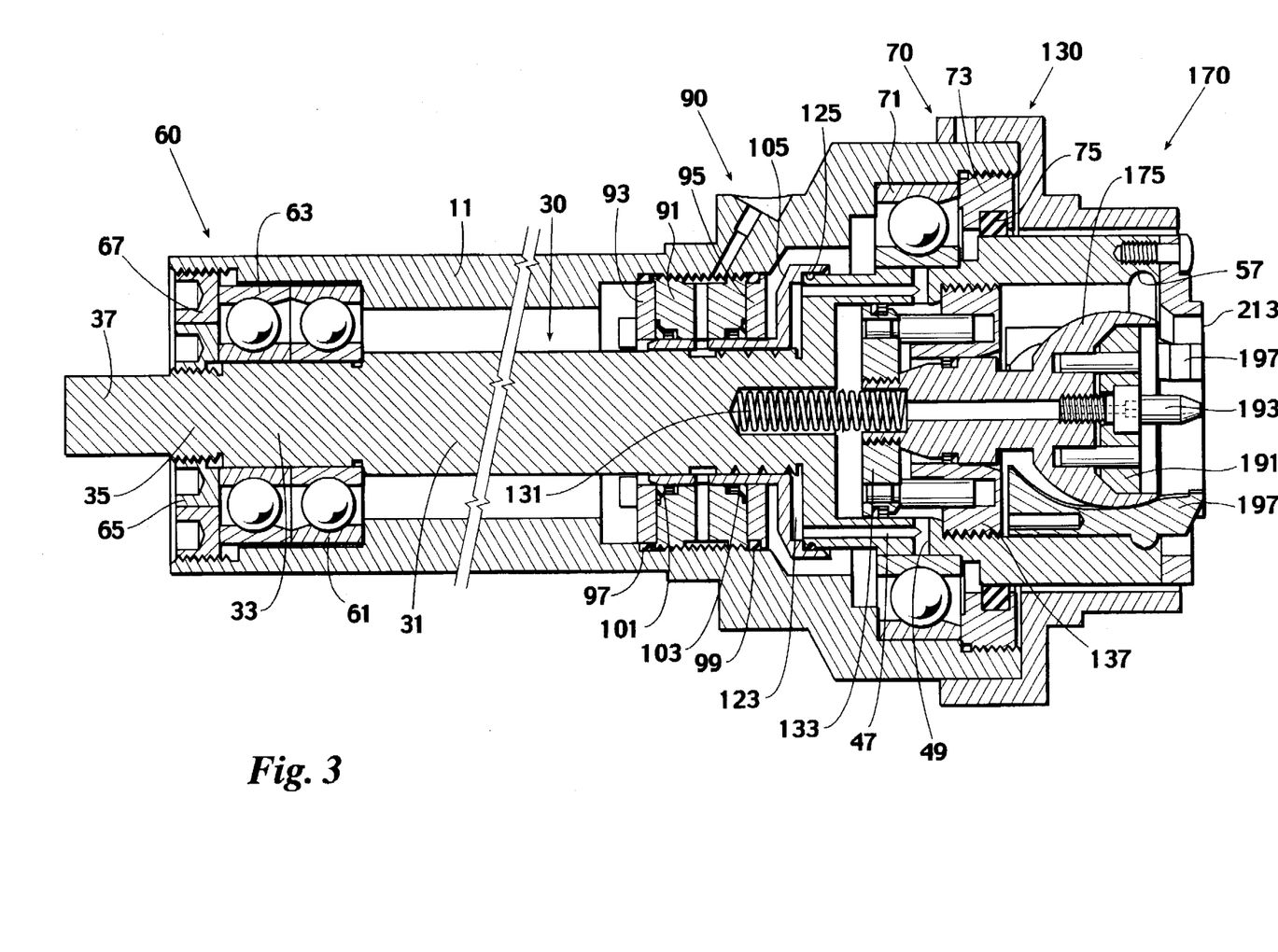
FIG. 3 is a longitudinal cross-section of the air pressurized chuck of FIG. 1 in open condition.
Figure 4:
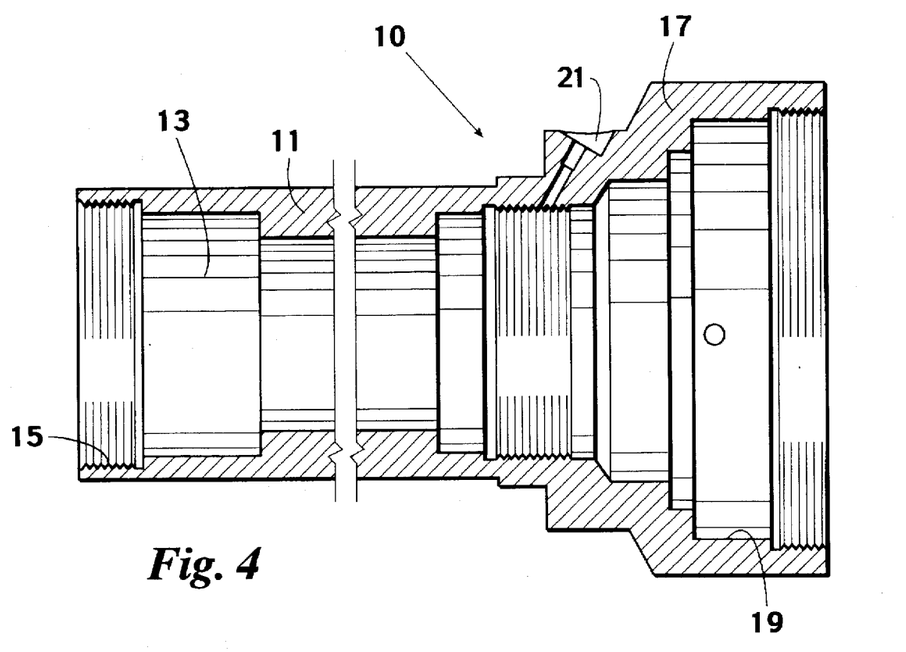
FIG. 4 is a longitudinal cross-section of a preferred embodiment of the housing of the air pressurized chuck of FIG. 1.
Figure 5:
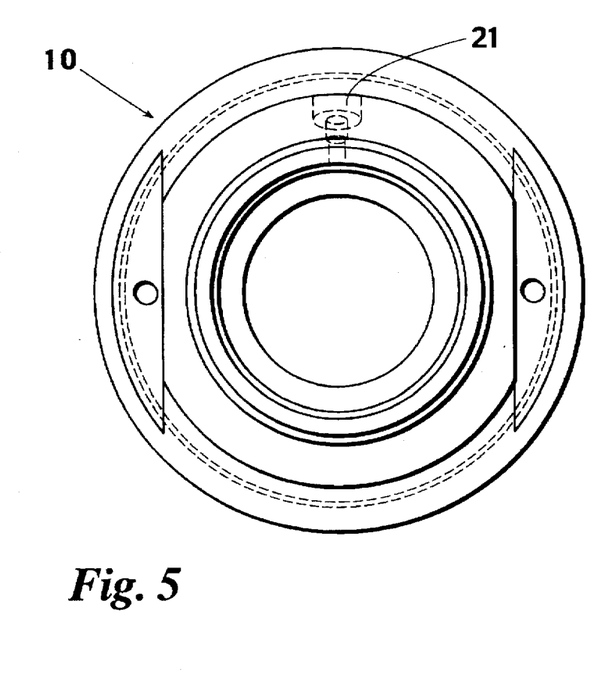
FIG. 5 is a front end view of the housing of FIG. 4.
Figure 6:
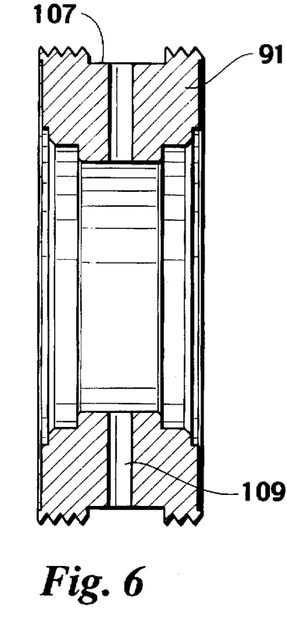
FIG. 6 is a longitudinal cross-section of a preferred embodiment of the air distribution sleeve of the air pressurized chuck of FIG. 1.
Figure 7:
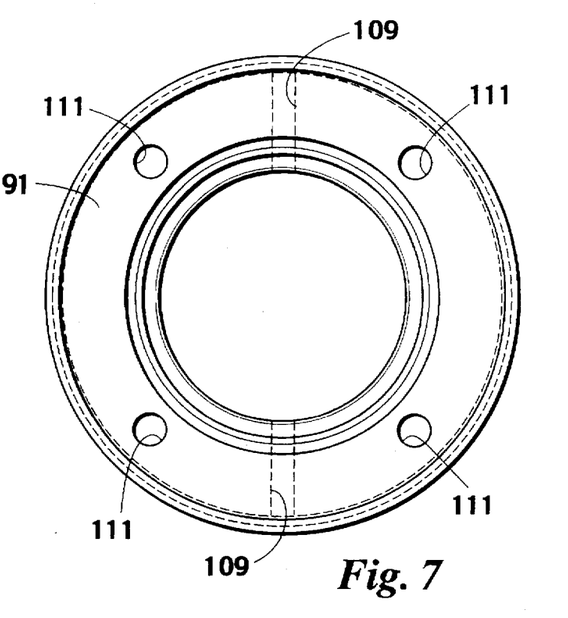
FIG. 7 is a front end view of the air distribution sleeve of FIG. 6.
Figure 8:
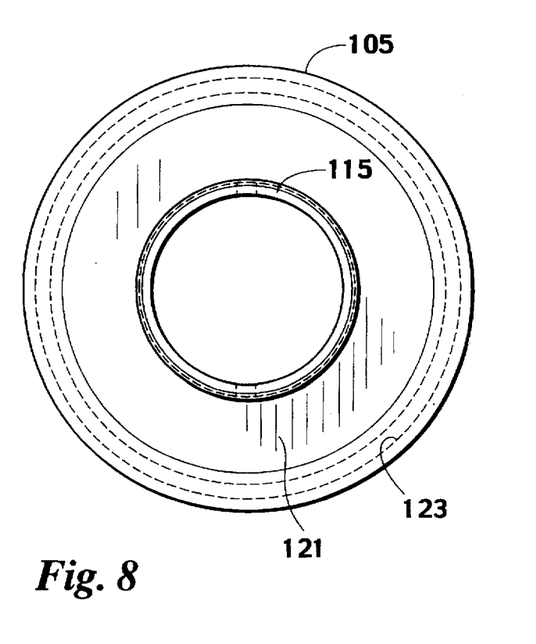
FIG. 8 is a rear end view of a preferred embodiment of the air distribution flange of the air pressurized chuck of FIG. 1.
Figure 9:
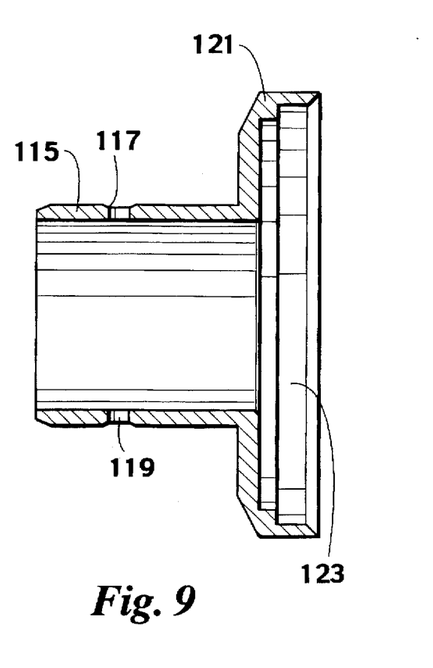
FIG. 9 is a longitudinal cross-section of the air distribution flange of FIG. 8.

Turning first to FIG. 1, the subassemblies of the air pressurized chuck include a chuck housing 10 in which a spindle 30 is journalled on a rear bearing assembly 60 and a front bearing assembly 70. A high speed seal assembly 90 isolates the housing 10 from the spindle 30. A piston assembly 130 mounted in a piston housing on the spindle 30 drives a chuck assembly 170 mounted within a chuck housing on the spindle 30. The subassemblies of FIG. 1 are illustrated in their assembled condition in FIGS. 2 and 3, the former illustrating the air pressurized chuck in its closed condition and the latter illustrating the air pressurized chuck in its open condition.

Looking now at FIGS. 1 through 5, a rear portion of the housing 10 consists of a cylindrical main body 11 having a concentric bearing bore 13 in its rear portion and a concentric threaded retainer bore 15 in its bearing bore 13. Front and rear bearings 61 and 63 are inserted into the bearing bore 13 and secured in place by inner and outer bearing retainers 65 and 67, the latter being threadedly engaged within the threaded retainer bore 15. A substantially cylindrical forward portion 17 of the housing 10 is of greater diameter than the main body and includes a concentric bore 19 at its forwardmost end. A bearing 71 inserted into the bore 19 is held in place by a front bearing retainer 73 which is sealed to the spindle 30 by a dust seal 75. Thus, the spindle 30 is journalled for rotation within the housing 10 on the rear and front bearing assemblies 60 and 70.

Looking now at FIGS. 1, 2, 3 and 6 through 9, the high speed seal assembly 90 includes an air distribution sleeve 91 sandwiched between rear and front sleeve plates 93 and 95. O-rings 97 and 99 circumferentially disposed about the rear and front sleeve plates 93 and 95 form a seal between the sleeve plates 93 and 95 and the interior wall of the housing 11. Rear and front sealing rings 101 and 103 at the rear and front of the interior wall of the air distribution sleeve 91 form a seal against an air distribution flange 105 about which the high speed seal assembly 90 is mounted. As can best be seen in FIG. 6, the air distribution sleeve 91 is provided with a circumferential air passage 107 about its periphery and with a diametric air passage 109 connecting opposite portions of the circumferential air passage 107 to the center of the sleeve 91. Four longitudinal apertures 111 are provided at ninety degree intervals through the air distribution sleeve 91 and screws 113 extending through the rear sleeve plate 93, the apertures 111 in the air distribution sleeve 91 and the front sleeve plate 95 secure the components of the high speed seal assembly 90 in the sandwich relationship. Only the O-rings 97 and 99, the sealing rings 101 and 103 and the threaded outer surfaces of the air distribution sleeve 91 actually come into contact with the housing 10. As can best be seen in FIG. 4, the housing 10 is provided with an air inlet passage 21 which pneumatically communicates with the circumferential air passage 107 in the air distribution sleeve 91. Thus, regardless of the angular position of the high speed seal assembly 90 within the housing 10, pneumatic communication will extend through the air inlet passage 21 in the housing 10 into the circumferential air passage 107 and then through the diametric air passage 109. As can best be seen in FIGS. 8 and 9, the neck 115 of the air distribution flange 105 has an annular depression 117 about its outer surface which is aligned with the diametric air passage 109 when the high speed seal assembly 90 is mounted on the air distribution flange 105. Air passing through the diametric air passage 109 surrounds the depression 117 in the neck 115 of the flange 105 and passes through diametrically opposed apertures 119 extending through the neck 115 at the depression 117. The base 121 of the air distribution flange 105 is internally machined to provide an annular air passage 123 defined by cooperation of the air distribution flange 105 with compatible machining on the outer surface of the spindle 30, as can best be seen in FIGS. 2 and 3.

Figures 10, 11:
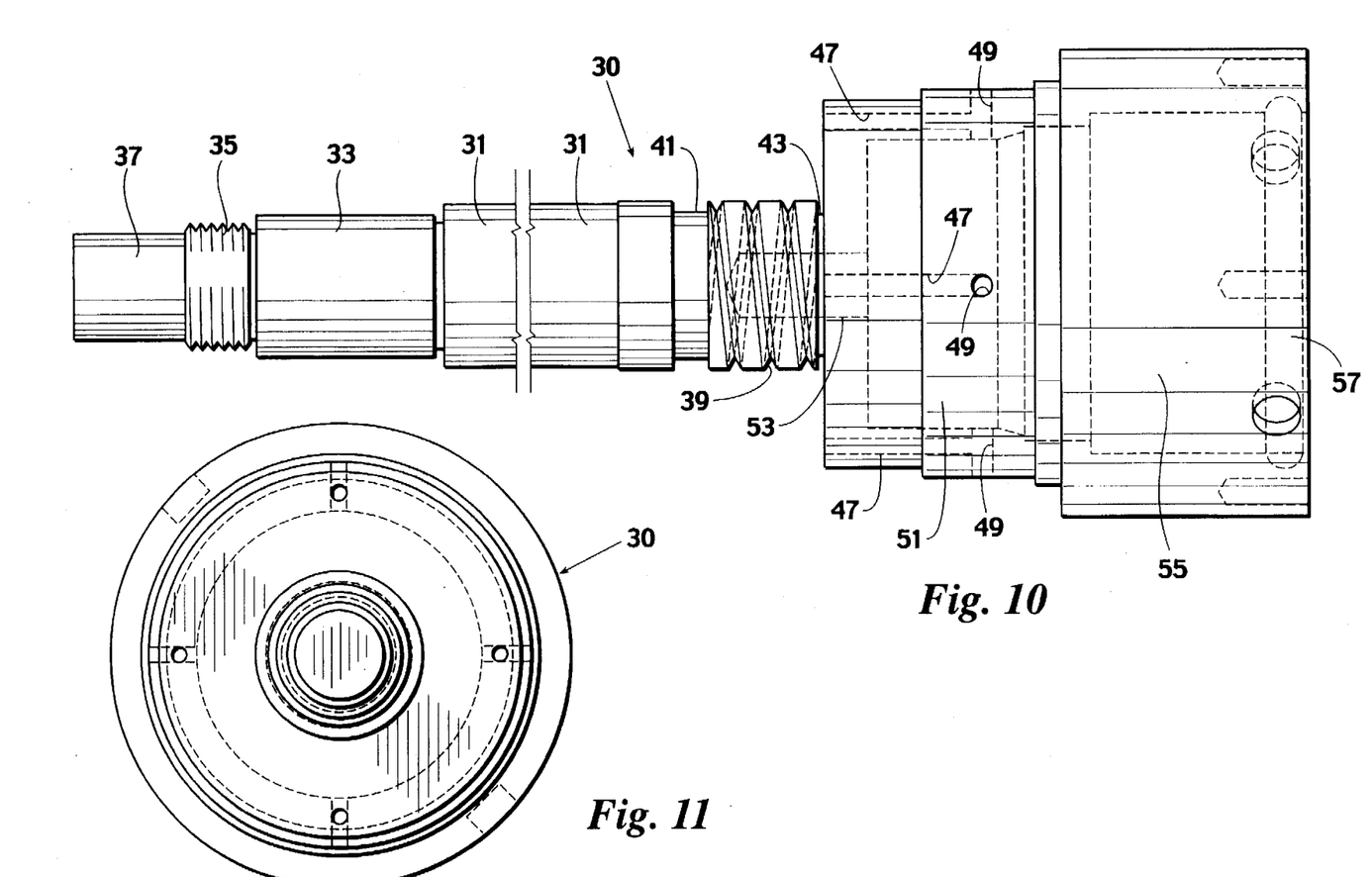
FIG. 10 is a side elevation view of a preferred embodiment of the spindle of the air pressurized chuck of FIG. 1.
FIG. 11 is a front end view of the spindle of FIG. 10.
Figure 12:
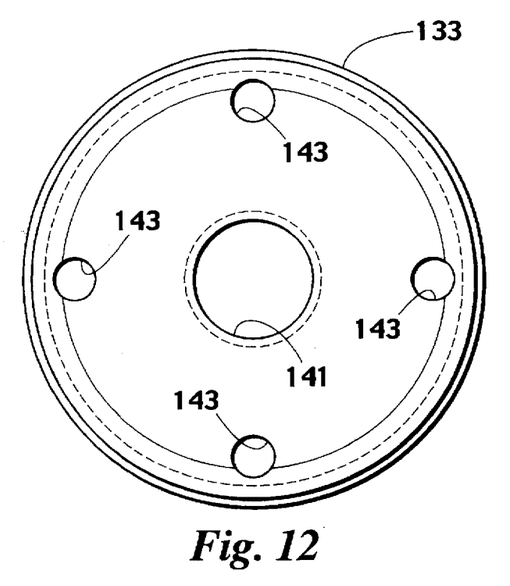
FIG. 12 is a front end view of a preferred embodiment of the piston of the air pressurized chuck of FIG. 1.
Figure 13:
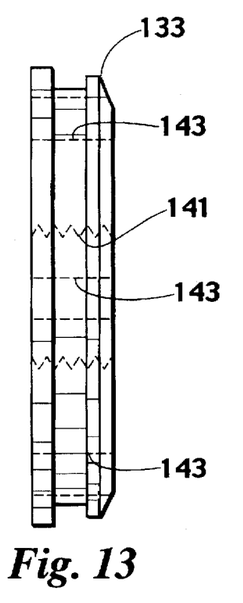
FIG. 13 is a side elevation view of the piston of FIG. 12.
Figure 14:
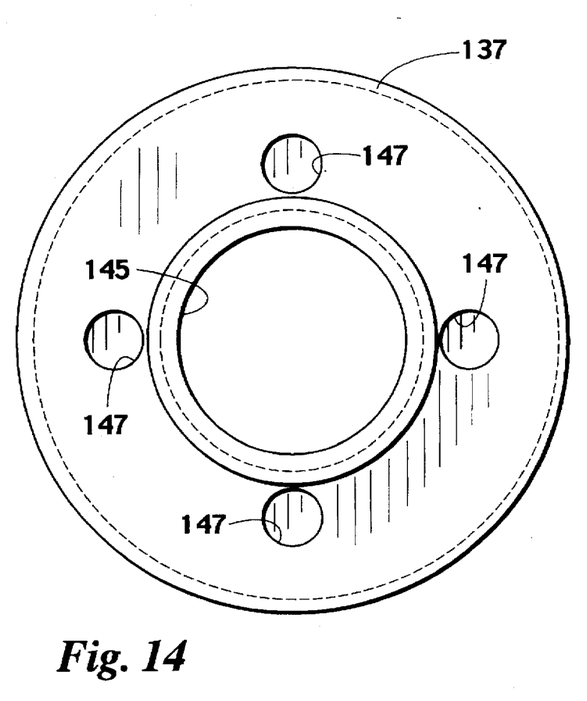
FIG. 14 is a rear end view of a preferred embodiment of the index ring of the air pressurized chuck of FIG. 1.
Figure 15:
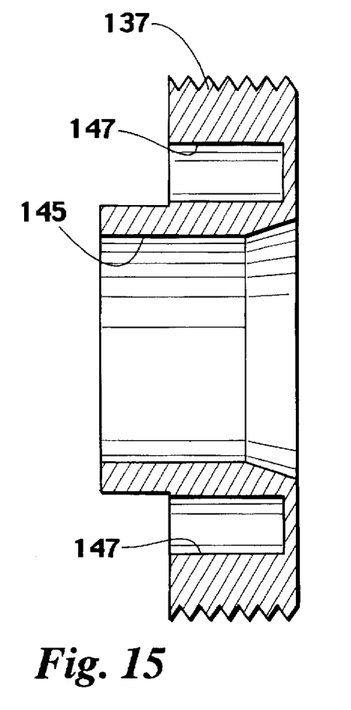
FIG. 15 is a longitudinal cross-section of the index ring of FIG. 14.
Figures 16, 17, 18, 19:
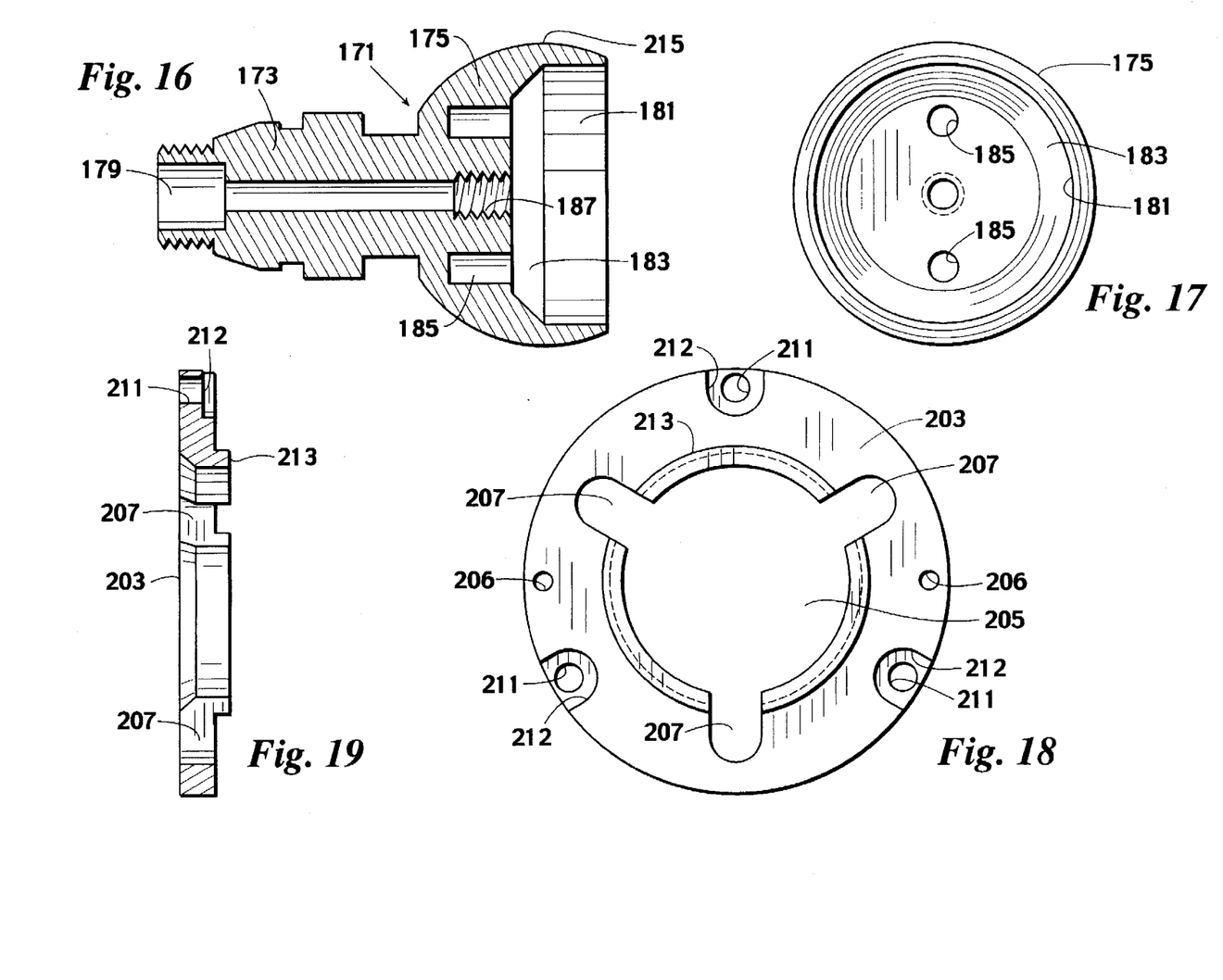
FIG. 16 is a longitudinal cross-section of a preferred embodiment of the axis rod of the air pressurized chuck of FIG. 1.
FIG. 17 is a front end view of the axis rod of FIG. 16.
FIG. 18 is a front end view of a preferred embodiment of the chuck face plate of the pressurized chuck of FIG. 1.
FIG. 19 is a longitudinal cross-section of the chuck face plate of FIG. 18.
Figure 20:
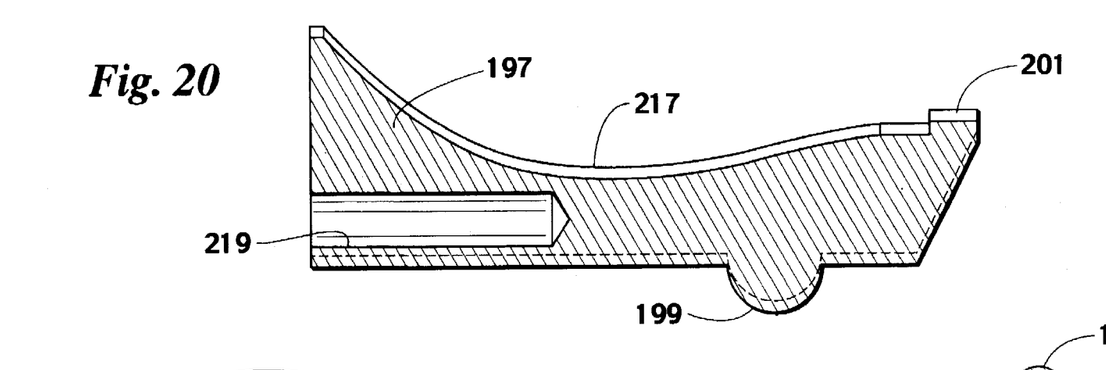
FIG. 20 is a longitudinal cross-section of a preferred embodiment of the fingers of the air pressurized chuck of FIG. 1.

Turning to FIGS. 10 and 11, the spindle 30 is illustrated in greater detail. As shown, the spindle 30 includes a narrow diameter main body 31 which extends rearwardly to a rear bearing portion 33, a rear bearing retainer portion 35 and an input shaft end 37. A forward portion of the main body 31 is machined to provide a V-shaped worm groove 39 which extends from an annular groove 41 at the rear of the worm groove 39 to an annular groove 43 at the front of the worm groove 39. The air distribution flange 105 aligns with the rear annular groove 41 in the spindle 30 so that air passing through the apertures 119 in the air distribution flange 105 enters the annular groove through the through the worm groove 39 and exits into the forward annular groove 43. The forward annular groove 43 in turn aligns with the annular air passage 123 defined by the air distribution flange 105 and the machined outer portion 45 of the spindle 30 so that air passes from the forward annular groove 43 into the annular air passage 123. The spindle 30 is also provided with four horizontal bores 47 which extend longitudinally from the annular air passage 123 to four radial bores 133 at ninety degree intervals to connect the horizontal bores 47 to the interior piston housing of the spindle 30. An O-ring 125 seals the base portion 121 of the air distribution flange 106 against the outer wall of the spindle 30 to prevent the escape of air from the annular passage 123 other than into the horizontal bores 47. The outer ends of the radial bores 49 are plugged so as to permit air to flow only into the piston housing 51 in the spindle 30.

Looking at FIGS. 1, 2, 3 and 12 through 15, the piston assembly 130 includes a coil spring 131, a piston 133 a seal ring 135 extending circumferentially about the piston 133 an index ring 137 and four piston pins 139 which guide the movement of the piston 133 within the piston housing 51. As can best be seen in FIGS. 12 and 13, the piston 133 is substantially a disk-like member having a central aperture 141 and four longitudinal apertures 143 displaced at ninety degree intervals toward the outer edge of the piston 133. The piston 133 is seated to slide in the piston housing 51 with the seal ring 135 disposed between the outer perimeter of the piston 133 and the inner wall of the piston housing 51. The coil spring 131 is seated in a longitudinal bore 53 extending part way into the main body 31 of the spindle 30 from the piston housing 51, as is best seen in FIG. 10. The index ring 137 is shown in greater detail in FIGS. 14 and 15 and is a disk-like member having a central aperture 145 through a longer interior portion of the disk and four longitudinally aligned seats 147 spaced at ninety degree intervals about a shorter outer portion of the ring 137. The index ring 137 is externally threaded to the interior of the piston housing 51. The piston pins 139 are press fit into the apertures 143 in the piston 133 and reciprocate within the seats 147 in the index ring 137. The piston 133 is driven rearwardly in the piston housing 51 by the force of the air entering the piston housing 51 through the radial bores 49 in the spindle 30.

Looking at FIGS. 1, 2, 3 and 16 through 22, the chuck assembly 170 includes an axis rod 171 shaped somewhat like a door knob with its neck portion 173 threadedly engaged in the central aperture 141 of the piston 133. The neck portion 173 of the axis rod 171 extends from the piston 133 longitudinally across the piston housing 51 to the rear of the knob portion 175 which is situated in a chuck housing 55 in the spindle 30. A seal ring 177 mounted circumferentially on the neck 173 of the axis rod 171 abuts the central aperture 145 in the index ring 137 to prevent the escape of air from the piston housing 51. The rear portion of the neck 173 has a longitudinal concentric bore 179 which aligns with the bore 53 in the spindle 30 to contain the spring 131 which drives the axis rod 171 forward to the open condition illustrated in FIG. 3. Air pressure applied to the face of the piston 133 in the piston housing 51 drives the piston 133 rearwardly, compressing the spring 131 and pulling the axis rod 171 to the closed condition illustrated in FIG. 2. The forward portion of the knob 175 has a wide bore 181 extending to a tapered seat 183 at approximately the midpoint of the knob 175. From the seat 183, a pair of vertically aligned longitudinal apertures 185 extend rearwardly into the back portion of the knob 175. Also extending axially through the axis rod 171 from the seat 183 is a small diameter bore 187 which is threaded at its forward end. An axis pin adapter 189 consisting essentially of a disk 191 with a first pair of vertically aligned longitudinal prongs 192 extending rearwardly from the disk 191 and a second pair of horizontally aligned longitudinal prongs 193 extending forwardly from the disk 191 is mounted within the bore 181 and seat 183 of the knob 175 by sliding the rearward disk prongs 192 into the apertures 185 in the knob 175. The adapter 189 is secured by a screw 195 which is seated in and extends through the adapter 189 and is threaded into the bore 187 in the knob 175. The bore 181 and seat 183 of the knob 175 can be configured to accept any of a variety of adapters suited to accept known lens blockers. As can best be seen in FIGS. 2 and 3, the length of the knob 175 is less than the length of the chuck assembly housing 55 in the spindle 30. As the piston 133 reciprocates in response to the force of the spring 131 and the force from the source of pressurized air, the knob 175 reciprocates within the chuck assembly housing 55. Three fingers 197 displaced at 120 degree intervals about thee knob 175 are cross-sectionally contoured to fit within, though not precisely, the space defined between the longitudinal surface of the knob 175 and the interior wall of the chuck assembly housing 55. As can best be seen in FIG. 10, the chuck assembly housing 55 has an annular depression 57 along its forward interior portion. As can best be seen in FIG. 20, each of the fingers 197 is provided with a mating knurl 199 which is seated in the annular depression 57 in the chuck assembly housing 55. The fingers 197 extend beyond the knurl 199 and the forward face of the spindle 30 to a clamping portion 201. The chuck assembly 170 is completed by a chuck face plate 203 which is illustrated in greater detail in FIGS. 18 and 19. As shown, the face plate 203 is essentially a disk-like member having a large central aperture 203 and three radial slots 207 spaced at 120 degree intervals and extending from the aperture 205 toward the perimeter of the plate 203. As shown in FIG. 1, dowels 204 extend forwardly from the spindle 30 into holes 206 in the face plate 203 to align the face plate 203 properly on the front end of the spindle 30. Screws 209 extend through apertures 211 into holes provided in the face of the spindle 30 to secure the face plate 203 to the spindle 30. The apertures 211 are recessed at 212 so that the screws 209 will clear a raised forward portion 213 on the plate 203 which extends slightly forward of the forwardmost portion of the fingers 197 as can best be seen in FIG. 2. The contour of the opposing faces 215 and 217 of the knob 175 and the fingers 197, respectively, is such that, when the knob 175 is driven to its forwardmost position by the spring 131, the surfaces 215 and 217 cooperate to rotate the fingers 197 about the pivot formed by the depression 57 and the knurl 199 to widen the distance between the clamping portions 201 of the fingers 197. When the application of air pressure to the piston housing 51 causes the piston 133 and therefore the knob 175 to move in a rearward direction, the opposing surfaces 215 and 217 of the knob 175 and the fingers 197 cause the fingers 197 to pivot and bring the clamping portions 201 of the fingers 197 in closer proximity to each other. In the preferred embodiment shown, the opposing surfaces 215 and 217 are such and the distances between the knurl 199 and the opposite ends of the fingers 197 are such that a two to one lever advantage results. That is, as the fingers 197 rotate about their instantaneous center or pivot, the distance from the tangent point of the cam to the pivot is twice the distance from the gripping point to the pivot.

Figure 21:
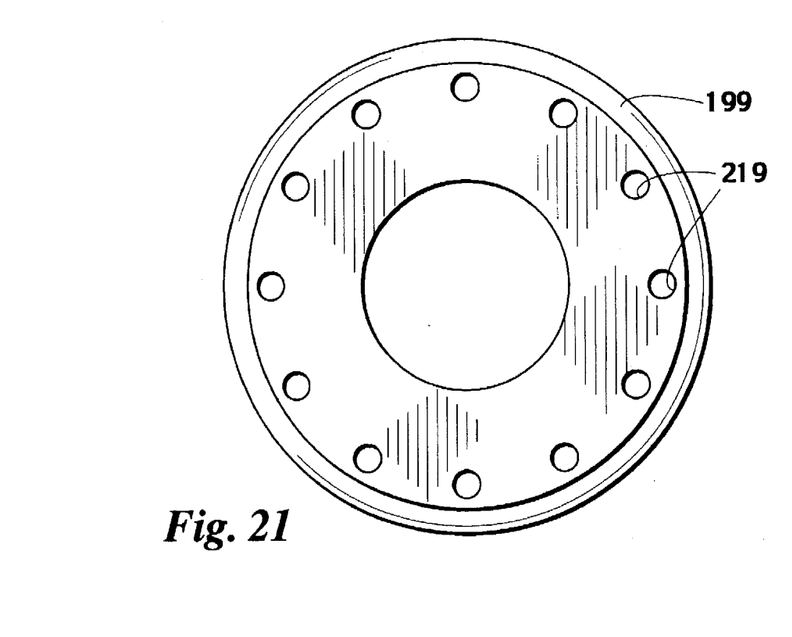
FIG. 21 is a rear end view of a unitary member from which the fingers of FIG. 20 may be formed.
Figure 22:
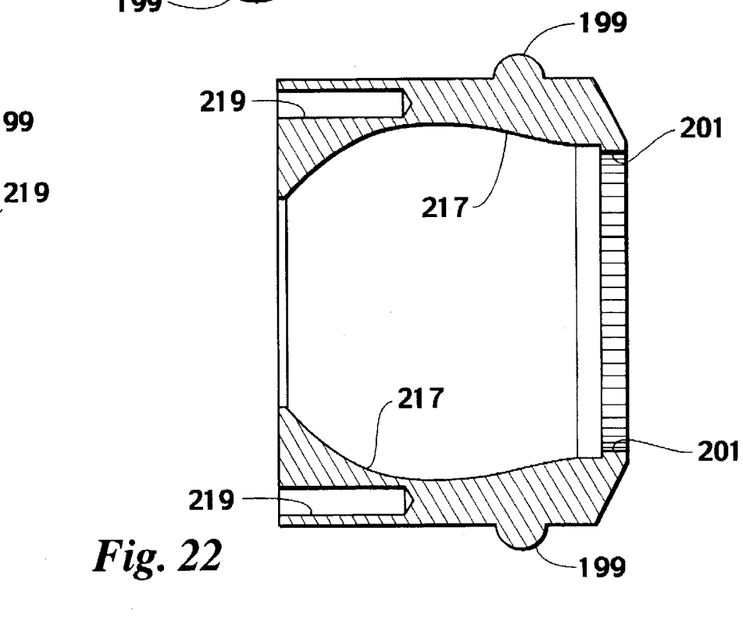
FIG. 22 is a longitudinal cross-section of the member of FIG. 21.

As a result of the hereinbefore described structure of the air pressurized chuck, when a lens blank (not shown) is mounted on the adapter 191, the fingers 197 will be in an open condition as a result of the knob 175 being driven to its forwardmost position by the spring 131. Therefore, the raised portion 213 of the chuck face 203 provides the reference face establishing the longitudinal position of the lens block in relation to the chuck. The positioning of this reference portion 213 is constant and entirely independent of the operation of the fingers 197 which will grip the block between the clamping portions 201 on the fingers. Consequently, when air pressure is applied to the piston 133 to drive the knob 175 rearwardly in the chuck assembly housing 55, the fingers 197 are rotated about their pivot point to grasp the longitudinal periphery of the block without changing the longitudinal relationship of the block to the chuck. Furthermore, as a result of this construction, the coil diameter of the spring 131 is reduced to a minimum, thus minimizing the negative impact of imbalances in the spring structure which might cause wobble in the rotating chuck assembly 170. Furthermore, the disposition of the fingers 197 at 120 degree intervals further minimizes the possibility of wobble resulting from inconsistencies in the formation of the fingers 197. Tooling holes 219 are provided to facilitate fabrication of the fingers 197. Moreover, it is anticipated that the fingers 197 associated with a given chuck assembly 170 will be segments of a single asymmetrical member most likely twelve segments from a single member, as is shown in FIGS. 21 and 22.

While many variations in all of the above described subassemblies will be obvious to those skilled in the art, it is essential that any such variations would maintain the independent relationship of the longitudinal reference structure from the block gripping structure of the device and also minimize asymmetry about the longitudinal axis of the chuck. It is also contemplated that a coil spring could be used to close the chuck and a pressurized fluid system to open it, and that other known actuating systems could be interchangeably used as well.

Thus, it is apparent that there has been provided, in accordance with the invention, an air pressurized chuck that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. An air pressurized chuck comprising:

a housing;

a spindle journalled in said housing for rotation about a longitudinal axis; means mounted in a penultimate portion of said spindle and rotatable therewith for longitudinally reciprocating along said axis in one direction in response to the bias of a coil spring of diameter less than a smallest outer diameter of said reciprocating means disposed concentrically about said axis between said spindle and said reciprocating means and in an opposite direction in response to a force of fluid under pressure selectively applied to said reciprocating means in excess of said bias; and means mounted in an ultimate portion of said spindle and rotatable therewith for concentrically reciprocating gripping portions thereof in relation to said longitudinal axis in an outward direction in response to movement of said longitudinal reciprocating means in said one direction and in an inward direction in response to movement of said longitudinal reciprocating means in said opposite direction.

2. A chuck according to claim 1 further comprising a plate fixed to said spindle and rotatable therewith for establishing a reference plane transverse to said longitudinal axis.

3. A chuck according to claim 1, said spring having a diameter small than a smallest outer diameter of said spindle.

4. An air pressurized chuck comprising:

a housing;

a spindle journalled in said housing for rotation about a longitudinal axis, said spindle having penultimate and ultimate cylindrical housings in a forward portion thereof;

a piston longitudinally reciprocable in said penultimate cylindrical housing;

a rod fixed to said piston for reciprocation therewith having a knob symmetrically extending forwardly therefrom in said ultimate cylindrical housing and a coil spring seated in said spindle concentrically about said axis and biasing said piston forwardly, said spring having a diameter less than a smallest diameter of said rod;

a plurality of symmetrically displaced fluid ports into said penultimate housing forward of said piston for selectively admitting fluid under pressure therein to overcome said spring bias and drive said piston rearwardly;

a plurality of longitudinally extending fingers symmetrically displaced for reciprocal motion of said knob therebetween and pivotally engaged with said ultimate cylindrical housing for concentric reciprocation of a forward portion of said fingers in relation to said longitudinal axis, said fingers having a camming surface contoured to an opposing surface of said knob whereby said fingers move in an outward direction in response to forward movement of said knob and in an inward direction in response to rearward movement of said knob.

5. A chuck according to claim 4, said spring having a diameter smaller than a smallest outer diameter of said spindle.

6. An air pressurized chuck comprising:

a housing;

a spindle journalled in said housing for rotation about a longitudinal axis, said spindle having penultimate and ultimate cylindrical housings in a forward portion thereof;

a piston longitudinally reciprocable in said penultimate cylindrical housing;

a coil spring seated in said spindle concentrically about said axis and biasing said piston forwardly;

a plurality of symmetrically displaced fluid ports into said penultimate housing forward of said piston for selectively admitting fluid under pressure therein to overcome said spring bias and drive said piston rearwardly;

a rod fixed to said piston for reciprocation therewith having a knob symmetrically extending forwardly therefrom in said ultimate cylindrical housing;

a plurality of longitudinally extending fingers symmetrically displaced for reciprocal motion of said knob therebetween and pivotally engaged with said ultimate cylindrical housing for concentric reciprocation of a forward portion of said fingers in relation to said longitudinal axis, said fingers having a camming surface contoured to an opposing surface of said knob whereby said fingers move in an outward direction in response to forward movement of said knob and in an inward direction in response to rearward movement of said knob; and a plate fixed to a forward end of said ultimate housing and having a forward surface thereon establishing a reference plane transverse to said longitudinal axis and forward of a forwardmost portion of said fingers.

7. An air pressurized chuck comprising:

a housing;

a spindle journalled in said housing for rotation about a longitudinal axis, said spindle having penultimate and ultimate cylindrical housings in a forward portion thereof, a piston longitudinally reciprocable in said penultimate cylindrical housing;

a coil spring seated in said spindle concentrically about said axis and biasing said piston forwardly;

a plurality of symmetrically displaced fluid ports into said penultimate housing forward of said piston for selectively admitting fluid under pressure therein to overcome said spring bias and drive said piston rearwardly;

a rod fixed to said piston for reciprocation therewith having a knob symmetrically extending forwardly therefrom in said ultimate cylindrical housing;

a plurality of longitudinally extending fingers symmetrically displaced for reciprocal motion of said knob therebetween and pivotally engaged with said ultimate cylindrical housing for concentric reciprocation of a forward portion of said fingers in relation to said longitudinal axis, said fingers having a camming surface contoured to an opposing surface of said knob whereby said fingers move in an outward direction in response to forward movement of said knob and in an inward direction in response to rearward movement of said knob; and a plate fixed to a forward end of said ultimate housing and having a forward surface thereon establishing a reference plane transverse to said longitudinal axis and forward of a forwardmost portion of said fingers, said plate having a central aperture therethrough for permitting a block to be chucked to have a rearward portion thereof rearwardly inserted between said forwardmost portions of said fingers until a forward portion thereof abuts said forward surface of said plate.

8. A chuck according to claim 7, said plate having a plurality of radial slots for concentric reciprocation of said fingers therein.

9. An air pressurized chuck comprising:

a housing;

a spindle journalled in said housing for rotation about a longitudinal axis, said spindle having penultimate and ultimate cylindrical housings in a forward portion thereof;

a piston longitudinally reciprocable in said penultimate cylindrical housing;

a coil spring seated in said spindle concentrically about said axis and biasing said piston forwardly;

a plurality of symmetrically displaced fluid ports into said penultimate housing forward of said piston for selectively admitting fluid under pressure therein to overcome said spring bias and drive said piston rearwardly;

a rod fixed to said piston for reciprocation therewith having a knob symmetrically extending forwardly therefrom in said ultimate cylindrical housing; and a plurality of longitudinally extending fingers symmetrically displaced for reciprocal motion of said knob therebetween and pivotally engaged with said ultimate cylindrical housing for concentric reciprocation of a forward portion of said fingers in relation to said longitudinal axis, said fingers having a camming surface contoured to an opposing surface of said knob whereby said fingers move in an outward direction in response to forward movement of said knob and in an inward direction in response to rearward movement of said knob, said pivotal engagement comprising an instantaneous pivot defined by a knurl extending outwardly from each of said fingers into an annular groove along a forward portion of said ultimate housing.

10. A chuck according to claim 9, said camming surface and said opposing surface being contoured to provide a distance from a tangent point of said surfaces to said instantaneous pivot approximately equal to twice a distance from said instantaneous pivot to said forward portion of said fingers.

11. An air pressurized chuck comprising:

a housing;

a spindle journalled in said housing for rotation about a longitudinal axis, said spindle having penultimate and ultimate cylindrical housings in a forward portion thereof;

a piston longitudinally reciprocable in said penultimate cylindrical housing;

a coil spring seated in said spindle concentrically about said axis and biasing said piston forwardly;

a plurality of symmetrically displaced fluid ports into said penultimate housing forward of said piston for selectively admitting fluid under pressure therein to overcome said spring bias and drive said piston rearwardly;

a rod fixed to said piston for reciprocation therewith having a knob symmetrically extending forwardly therefrom in said ultimate cylindrical housing;

a plurality of longitudinally extending fingers symmetrically displaced for reciprocal motion of said knob therebetween and pivotally engaged with said ultimate cylindrical housing for concentric reciprocation of a forward portion of said fingers in relation to said longitudinal axis, said fingers having a camming surface contoured to an opposing surface of said knob whereby said fingers move in an outward direction in response to forward movement of said knob and in an inward direction in response to rearward movement of said knob; and a ring fixed to said penultimate housing having a central aperture for slidable reciprocation therein of a neck of said rod and means annularly disposed therebetween for preventing flow of fluid from said penultimate housing into said ultimate housing.

12. A chuck according to claim 11, said ring having a plurality of symmetrically displaced apertures slidably receiving pins extending forwardly from said piston therein for preventing rotation of said piston and for guiding reciprocal motion of said piston relative to said axis.

13. An air pressurized chuck comprising:

a housing;

a spindle journalled in said housing for rotation about a longitudinal axis, said spindle having penultimate and ultimate cylindrical housings in a forward portion thereof;

a piston longitudinally reciprocable in said penultimate cylindrical housing;

a coil spring seated in said spindle concentrically about said axis and biasing said piston forwardly;

a plurality of symmetrically displaced fluid ports into said penultimate housing forward of said piston for selectively admitting fluid under pressure therein to overcome said spring bias and drive said piston rearwardly;

a rod fixed to said piston for reciprocation therewith having a knob symmetrically extending forwardly therefrom in said ultimate cylindrical housing; and a plurality of longitudinally extending fingers symmetrically displaced for reciprocal motion of said knob therebetween and pivotally engaged with said ultimate cylindrical housing for concentric reciprocation of a forward portion of said fingers in relation to said longitudinal axis, said fingers having a camming surface contoured to an opposing surface of said knob whereby said fingers move in an outward direction in response to forward movement of said knob and in an inward direction in response to rearward movement of said knob, said knob having a bore and a seat extending rearwardly therein and contoured to receive an adapter for holding a block therein.

14. An air pressurized chuck comprising:

a housing;

a spindle journalled in said housing for rotation about a longitudinal axis;

means mounted in a penultimate portion of said spindle and rotatable therewith for longitudinally reciprocating along said axis;

first force exerting means for driving said reciprocating means in one direction;

second force exerting means for driving said reciprocating means in an opposite direction; and means mounted in an ultimate portion of said spindle and rotatable therewith for concentrically reciprocating pivotally engaged gripping portions thereof in relation to said longitudinal axis in an outward direction in response to movement of said longitudinal reciprocating means in said one direction and in an inward direction in response to movement of said longitudinal reciprocating means in said opposite direction, said pivotal engagement being an instantaneous pivot defined by a knurl extending outwardly from said gripping portion into an annular groove along a forward portion of said housing.

15. A chuck according to claim 14, said first force exerting means being a coil spring.

16. A chuck according to claim 15, said second force exerting means being a fluid pressure actuator.

* * * * *